United States Patent
Spahr et al.

(10) Patent No.: US 9,604,495 B2
(45) Date of Patent: Mar. 28, 2017

(54) HUB FOR A BICYCLE

(75) Inventors: Stefan Spahr, Lengnau (CH); Thomas Gasser, Detlingen (CH)

(73) Assignee: DT SWISS INC., Grand Junction, CO (US)

( * ) Notice: Subject to any disclaimer, the term of this patent is extended or adjusted under 35 U.S.C. 154(b) by 283 days.

(21) Appl. No.: 13/437,543

(22) Filed: Apr. 2, 2012

(65) Prior Publication Data

US 2012/0248854 A1 Oct. 4, 2012

(30) Foreign Application Priority Data

Apr. 4, 2011 (DE) ........................ 10 2011 015 962

(51) Int. Cl.
*B60B 1/04* (2006.01)
*B60B 27/02* (2006.01)

(52) U.S. Cl.
CPC ............ *B60B 1/042* (2013.01); *B60B 27/023* (2013.01); *B60Y 2200/13* (2013.01)

(58) Field of Classification Search
CPC B60B 1/003; B60B 1/04; B60B 1/041; B60B 1/042; B60B 27/023; B60B 27/047

USPC ................................................... 301/59, 110.5
See application file for complete search history.

(56) References Cited

U.S. PATENT DOCUMENTS

| 5,626,401 | A | * | 5/1997 | Terry et al. ...................... 301/59 |
| 7,354,114 | B2 | * | 4/2008 | Passarotto et al. ............ 301/104 |
| 7,631,944 | B2 | * | 12/2009 | Meggiolan ....................... 301/59 |
| 7,735,936 | B2 | * | 6/2010 | Passarotto et al. ........... 301/104 |
| 7,967,392 | B2 | * | 6/2011 | Meggiolan ....................... 301/59 |
| 2006/0170277 | A1 | * | 8/2006 | Passarotto et al. ............. 301/59 |
| 2011/0193403 | A1 | * | 8/2011 | Chen ............................... 301/59 |

FOREIGN PATENT DOCUMENTS

DE 60116463 8/2006
EP 1 923 232 5/2008

* cited by examiner

*Primary Examiner* — Jason Bellinger
(74) *Attorney, Agent, or Firm* — Greer, Burns & Crain, Ltd.

(57) ABSTRACT

A hub and wheel equipped with a hub body and an axle that rotatably receives the hub body. The hub body is provided with two circumferential hub flanges which accommodate and define an orientation of multiple spokes. Each of the spokes including a spoke body and a flattened spoke head. The hub flange is configured to fix the flattened spoke head to only one axial side wall.

9 Claims, 6 Drawing Sheets

HUB FOR A BICYCLE

BACKGROUND

The present invention relates to a hub and a wheel for an at least partially muscle-powered two-wheeled vehicle and in particular a bicycle.

In the field of sports and also in competitions aerodynamically shaped bicycle components are increasingly employed to reduce drag during riding and to thus permit higher maximum and average speeds.

Other than spoke wheels, disk wheels are employed to reduce air drag. Disk wheels have the disadvantage, however, of causing perceptibly increased susceptibility to side winds.

Therefore, to reduce the air drag in spoke wheels, wheels have become known where the spoke bodies are flattened, being knife-like in structure and causing considerably reduced flow resistance in the riding direction. At the same time, the number of spokes tends to be reduced to still further reduce air drag.

With these flattened spoke bodies it is important for the spokes to be positioned in the direction of flow with their flattened sides since otherwise the flow resistance would not be reduced but inadvertently increased. A slight twist to the spoke bodies can already perceptibly increase air drag. Therefore hubs have become known which firmly receive the flattened heads of the spokes on two sides of a U-shaped groove where they are specifically guided to ensure a defined seat of the flattened spokes in operation.

The drawback of the known hubs in which the flattened spoke heads are firmly clamped and non-rotatably held in a fastening groove is that the hub only allows a precisely radial orientation of the knife-like spokes. The peripheral groove produced by way of an undercut in the hub body ensures a reliably firm seat only in the case of a precisely radial orientation of the spoke. Furthermore, the axial width of the groove must be matched precisely to the width of the flattened spoke head so as to attain security against twisting of the spokes received.

In typical wheels, a spoke is fastened to the hub at one of the two hub flanges provided axially outwardly. As a rule, the spoke is centrally fastened to the rim at the rim base. Rims with the spokes fastened to the rim flanks exist as well. In all of these cases, the spoke has a shape showing, other than a considerable radial element, also a significant axial element so as to bridge the axial distance between the fastening spot at the hub flange and the fastening spot at the rim.

Therefore, even in the case of spokes non-rotatably received in a fastening groove, alignment of the fastening groove should precisely match the alignment of the spoke to prevent the spoke from buckling. To this end, a three-dimensional, conical fastening groove would have to be inserted into the hub body. Only this would ensure a straight orientation of all the spokes showing no bending. However, this is too complicated and expensive when manufacturing such a fastening groove. Therefore, in the case of non-rotatably received, knife-like spokes, buckling in the spoke shape is accepted. This results in reduced stressability and in a spoke that is thicker than is actually required.

A considerable drawback of such a spoke accommodation in a fastening groove at the hub furthermore consists in that a purely radial alignment of the spokes is not possible for the transmission of driving force and also for the transmission of braking force e.g. via disk brakes. This is why the known systems are not suitable to be employed with the rear wheels of bicycles since these at least partially require an at least partially tangential spoke alignment to allow transmission of the torque applied.

SUMMARY

It is therefore the object of the present invention to provide a hub and a wheel for an at least partially muscle-powered vehicle by way of which a defined alignment of spokes, which may be flattened, at the hub is possible wherein a force-transmitting arrangement of the spokes is intended to be likewise possible.

The hub according to the invention is provided with a hub body and an axle to rotatably receive the hub body. The hub body is provided with at least one circumferential hub flange serving for receiving and defined orientation of a multitude of spokes. At least one spoke comprises a spoke body and a flattened spoke head. The circumferential hub flange is configured to fix the flattened spoke head by way of one axial side wall only.

The hub according to the invention has many advantages. One considerable advantage of the hub according to the invention consists in that the spoke or each of the spokes is only fixed to exactly one axial side wall. The hub is suitable for the use of spokes having flattened spokes or spoke bodies. A well defined alignment of the spokes can be ensured by way of which air drag is reduced.

In the prior art hubs have become known for spokes aligned straight and round in cross-section ("straight pull"). In these hubs there is no buckling in the shape of the spokes. However, the hub is not provided with any security against twisting for the spokes. A drawback is the increased air drag. This known spoke is not suitable for twist-proof arrangements of knife-like configured spokes.

The hub according to the invention provides for the spoke head to be flattened at least on one side. The flattening is in particular aligned with an embossing that the spoke body may be provided with.

Preferably the circumferential hub flange is provided with at least one receiving pocket to receive a flattened spoke head. A defined seat of the spoke can be ensured in that the spoke with its spoke head is advantageously received at a receiving pocket. The seat of the spoke does not change in operation even in the case of shocks and the like.

In a preferred specific embodiment the receiving pocket is matched to the spoke head cross-section. This ensures a form-fitting seat of the spoke head in the receiving pocket such that a defined seat of the spoke can be particularly well ensured.

In advantageous configurations the receiving pocket is axially outwardly open and is in particular only bordered by one axial sidewall. The axial side wall is aligned axially inwardly toward the center of the hub body. This allows a spoke guidance where one hub flange is provided at each of the two ends of the hub body. The spokes extend radially outwardly from the two hub flanges, although they may extend axially inclined towards the rim. In this way, the spokes transmit other than radial forces, also forces in the axial direction which results in that the spoke heads firmly bear against the hub flanges in the axial direction. Twisting is not possible.

The flattened spoke heads are in particular approximately hammer-like in structure so as to firmly bear against the hub flange. Unintentional twisting is thus not possible.

In all of the configurations at least one spoke hole is preferably provided at the hub flange and/or the receiving pocket through which the spoke body emerges radially outwardly.

For a still better bearing of the spoke or the spoke head the spoke hole may at least partially be configured conically.

Advantageously, at least one receiving pocket is at least partially tangentially aligned to allow transmitting driving forces by way of an at least partially tangential alignment of the spoke body. In particular are the receiving pockets disposed such that at least some of the spokes are oriented cross-wise to one another.

At least one receiving pocket may be oriented radially to allow radial spoking. Radial only spoking may for example be provided in a front wheel.

In all of the configurations, it is possible and preferred for the spoke heads and/or the receiving pockets to be disposed at a circumferential shoulder of the hub flange. In this way, a defined position of the receiving pockets is ensured in the radial direction. The spoke heads and/or receiving pockets are accessible on the axial side for inserting the spokes into the spoke holes.

The invention allows cost-effective manufacturing of hubs with twist-proof spokes. The spokes may be guided without any harmful bending or buckling. The invention in particular allows (more) cost-effective manufacturing of hubs provided for receiving crossed spokes.

Preferably it is possible to provide an axial covering to allow an optically attractive design and/or to still further reduce air drag.

In all of the configurations, it is also possible to provide separate hub flanges which are non-rotatably connected with the hub body as separate components.

It is also possible to provide the spoke heads and/or receiving pockets in a receiving groove with the axial width of the receiving groove being larger than the axial width of the spoke head. This allows a possible angular orientation of the spoke towards the rim so as to avoid harmful spoke bending.

The groove-shaped configuration may for example ensue from placing a lid-like cover in front of the spoke heads and/or receiving pockets so as to result in a groove shape on the whole.

The wheel according to the invention comprises a hub and a rim and a multitude of spokes. The hub is provided with circumferential hub flanges on which the spokes are supported and from which the spokes emerge to connect the hub with the rim. At least one spoke comprises a flattened spoke head and in particular a flattened spoke body and with its flattened spoke head it is received and supported at a receiving pocket of the hub flange.

The hub according to the invention also has many advantages. A considerable advantage is achieved by the defined accommodation of the spokes at the wheel.

In an advantageous configuration, the receiving pocket cross-section is matched to the spoke head cross-section.

It is possible for the receiving pocket to be disposed in a receiving groove with the axial width of the receiving groove being larger than the axial width of the spoke head.

In all of the configurations, it is preferred for the spoke holes to be matched to the provided orientation of the spoke bodies in the radial, tangential, and axial directions to reduce as much as possible stresses on the spoke due to buckling points or the like. The prior art tended to provide bends in spokes at the edges of hub bodies or at the rim. These bends form considerably weak points and may cause spoke breaks. This is reliably prevented by an accordingly matched orientation of the spoke holes at the hub flanges.

The invention ensures a twist-proof accommodation of the spokes at the hub. During operation the knife side of the spoke cannot be oriented transverse to the traveling direction such that air drag is considerably reduced.

The receiving pocket allows a partially tangential orientation of the spoke without involving overstresses in the spoke receiving pocket. Now, if a spoke head were to bear against the hub body at one edge only, the surface pressure would be far too high such that damage to the hub body could be expected. The receiving pocket causes both of the edges or sides of the spoke head to be supported by the pocket. The receiving pocket is oriented so as to correspond to the spoke exit angle.

The spoke head is axially supported on one side only to realize security against twisting.

In the case of radial spoking the spoke holes tend to be cylindrical in shape. Cylindrical holes are easy and low-cost in manufacture. The spoke holes are preferably aligned toward the fastening point of the rim. In the case of radial spoking it is again advantageous for the spoke head to only bear against an axial side of the spoke head.

BRIEF DESCRIPTION OF THE DRAWINGS

Further advantages and features of the present invention can be taken from the exemplary embodiment which will be described below with reference to the accompanying figures.

The figures show in.

DETAILED DESCRIPTION

With reference to the enclosed FIGS. 1 to 12, an exemplary embodiment of wheels 10 according to the invention with hubs 1 according to the invention will be discussed by way of a bicycle 100.

Figure 1:
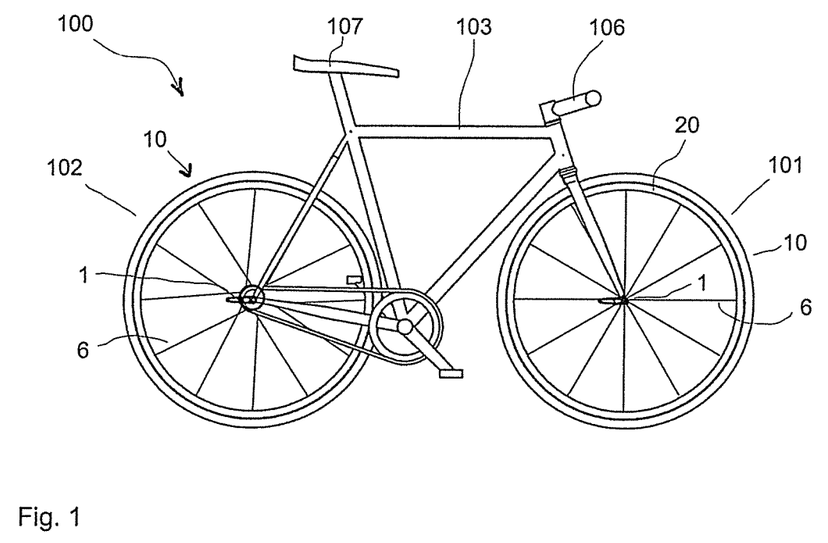
FIG. 1 a schematic side view of a bicycle.

The bicycle 100 in FIG. 1 comprises a front wheel 101 and a rear wheel 102 each of which is configured as a wheel 10 according to the invention and comprises a hub 1 according to the invention.

Furthermore, the bicycle 100 is equipped with a frame 103, a handlebar 106 and a saddle 107. The bicycle 100 comprises a chain drive with a gear-shifting device not shown in detail and may be equipped with disk brakes or else with conventional rim brakes.

Each wheel 10 comprises a hub 1 and a rim 20. Spokes 6 connect the hub 1 with the rim 20.

Figure 2:
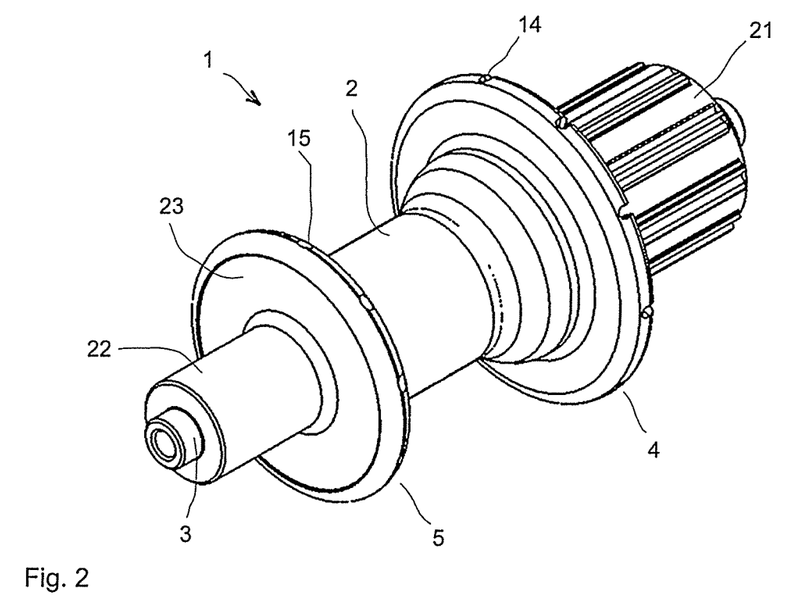
FIG. 2 a rear wheel hub of the bicycle according to FIG. 1.

FIG. 2 shows an enlarged perspective illustration of the hub 1 which is presently provided with a rotor 21 at which multiple sprockets of the gear shifting system are to be arranged.

The hub 1 comprises a hub body 2 at which two hub flanges 4 and 5 are disposed. It is possible for the hub flanges 4 and 5 to be integrally manufactured with the hub body 2. Or else it is possible for the hub flanges 4 and 5 to be manufactured as separate components and non-rotatably connected with the hub body 2.

The hub flanges 4 and 5 are provided with spoke holes 14 and 15 through which the spoke bodies 7 are pushed radially outwardly to connect the hub flanges 4 and 5 and thus the hub 1 with the rim 20.

In the illustration according to FIG. 2 the hub flange 5, at which the adapter member 22 is clearly recognizable, is disposed on the left. The adapter member 22 is provided with a covering disk 23 by means of which the spokes 6 or spoke heads 8 arranged between the hub flange 5 and the covering disk 23 are covered.

The hub 1 furthermore comprises an axle 3 by means of which the hub 1 can be fastened to the frame 103 or the fork of the bicycle 100. The hubs 1 may be configured as front wheel hubs or as rear wheel hubs.

Figure 3:
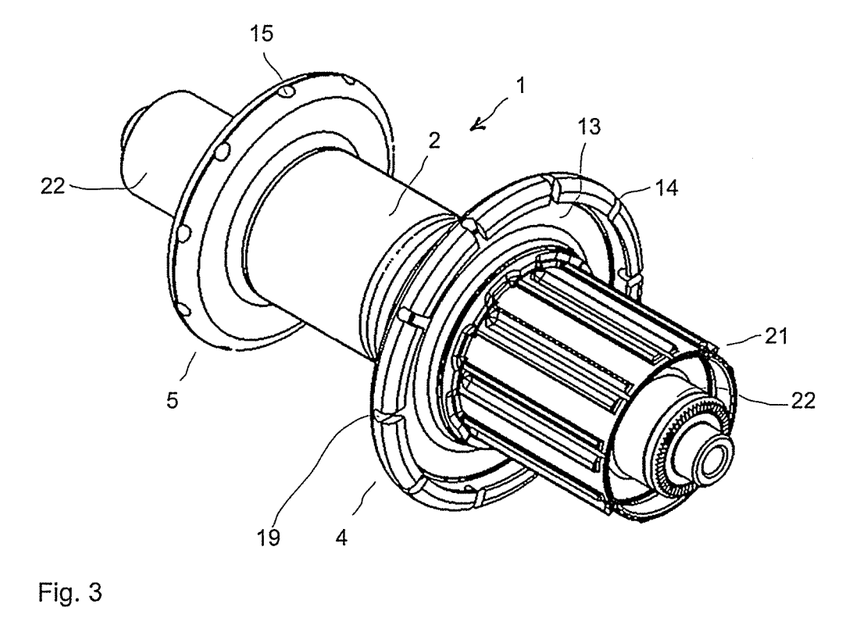
FIG. 3 the hub of FIG. 2 in another perspective view.

FIG. 3 shows another perspective illustration of the hub 1 wherein an adapter ring 22 is also disposed on the rotor 21 side.

A covering disk 23 is absent in the illustration of FIG. 3 so as to show the axial side wall 13 of the hub flange 4. In the exemplary embodiment the spoke holes 14 are configured as axial punches 19 so as to allow particular ease of manufacturing and assembly.

One can clearly see that the spokes 6 to be received in the spoke holes 14 with their spoke heads 8 bear against only one axial side of the side wall 13 where they are retained twist-proof since the spokes 6 are tensioned in the axial direction as well and thus they are pulled towards the side wall 13.

Figure 4:
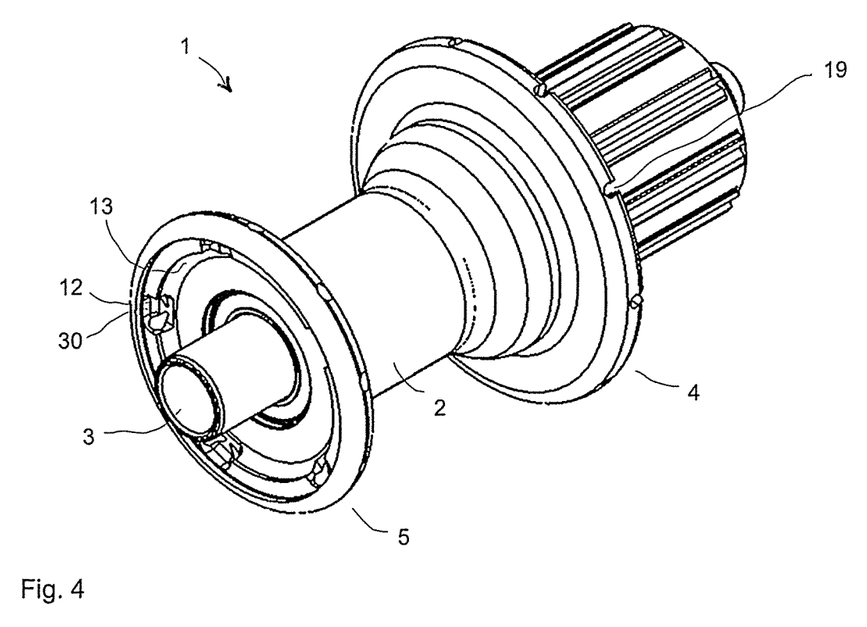
FIG. 4 the hub according to FIG. 2 with the adapter member removed.

FIG. 4 shows a perspective view of the hub 1 corresponding to FIG. 2 where the covering disk 23 has been removed and receiving pockets 11 and 12 provided at the hub flange 5 become visible. The receiving pockets 11 and 12 permit matched accommodation of the spoke heads 8 so as to firmly and twist-proof dispose the spoke heads 8 at the hub flange 5.

The spokes 6 disposed at the hub flange 5 are aligned not only in the radial direction but there is a tangential element in their alignment as well. This makes them suitable for transmitting torque to the rim 20. Adjacent receiving pockets 11 and 12 are as a rule aligned differently so as to obtain a spoked wheel 10 having crossed spokes 6 which ensure torque transmission.

Figure 5:
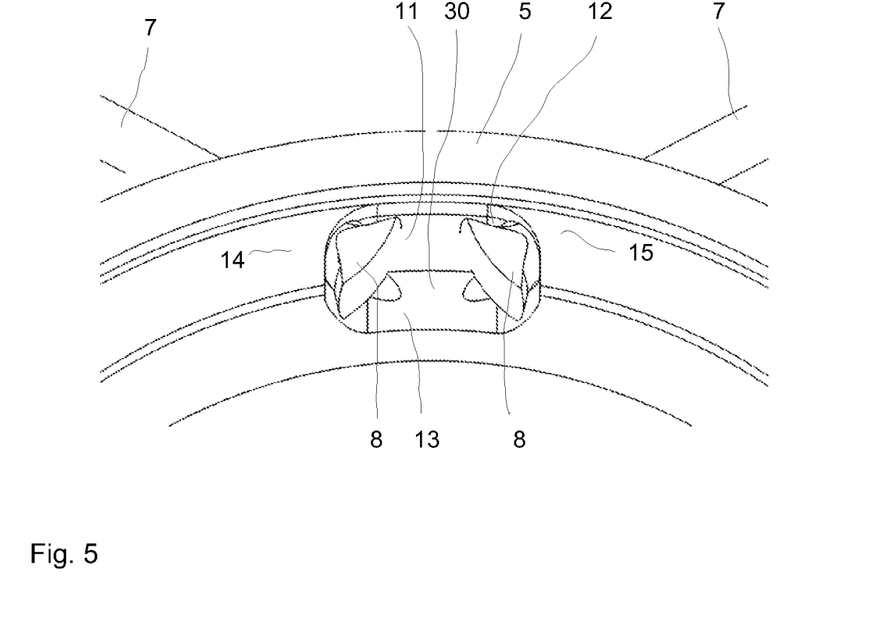
FIG. 5 the receiving pockets of a tangential spoking of a hub according to the invention.

FIG. 5 shows an enlarged illustration of the receiving pockets 11 and 12 at the hub flange 5 with spokes 6 disposed therein. The flattened spoke heads 8 with their hammer-like structure lie flat against the side wall 13 of the hub flange 5 and emerge out of the hub flange 5 through the spoke holes 15 in the radial and partially also in the tangential direction. The spoke bodies 7 are recognizable.

Figure 6:
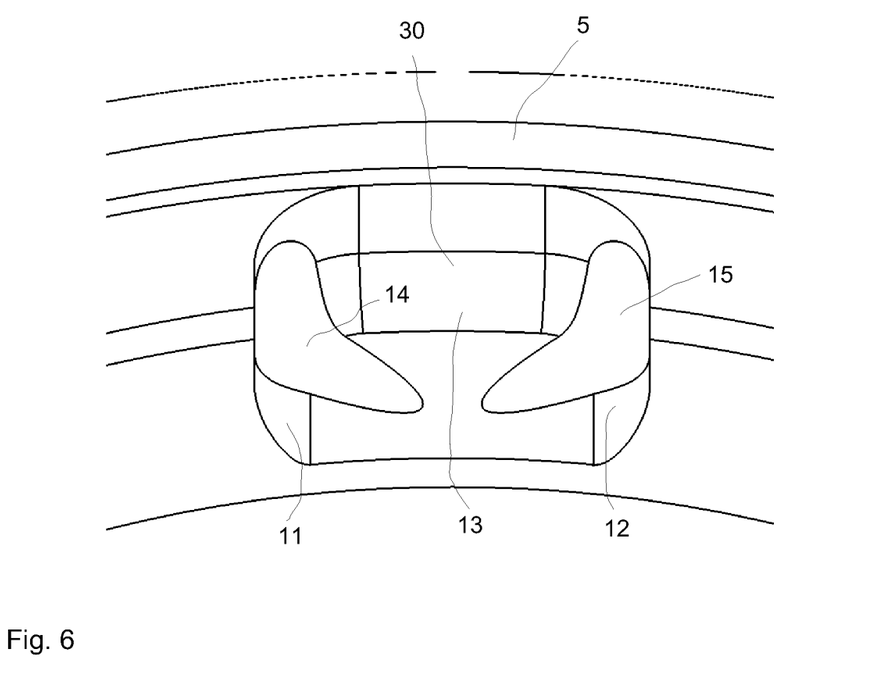
FIG. 6 the receiving pockets without any spokes inserted according to FIG. 5.

FIG. 6 shows a still more enlarged illustration according to FIG. 5 with the spokes 6 with the spoke heads 8 removed from the spoke holes 14 and 15. The spoke holes 14 and 15 are configured slightly conically to ensure a particularly good seat of the spoke heads 8 at the spoke holes 14 and 15. The cross-section 9 of the spoke heads is matched to the cross-section of the receiving pockets 11 or 12.

When assembled, the spoke heads 8 firmly bear against the side wall 13 with one of their sides so as to enable a defined though angular orientation in the axial direction of the spoke 6. The spoke 6 is received twist-proof at the hub 1 both in the case of radial mounting and in the case of partially tangential mounting.

Figure 7:
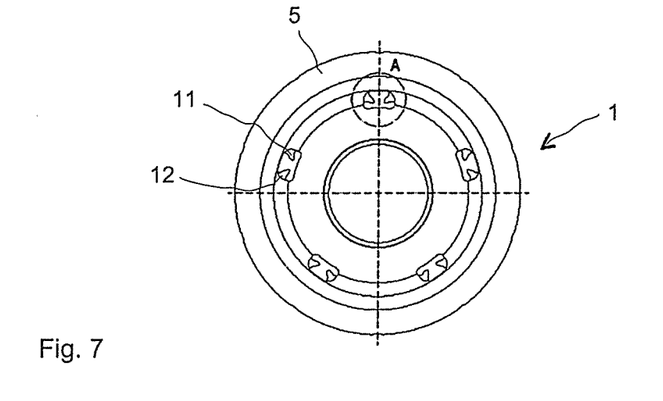
FIG. 7 a side view of a hub according to the invention.

FIG. 7 illustrates a side view of the hub 1 with the hub flange 5 with the covering disk 23 removed. On the whole the ten receiving pockets 11 or 12 are recognizable which are presently arranged in five pairs symmetrically distributed over the circumference. One of the receiving pockets is oriented in a tangential direction and the second receiving pocket of a pair of receiving pockets, in the other tangential direction. In this way, crossed spokes are provided allowing the transmission of torque for transmitting the driving force.

Figures 8, 9:
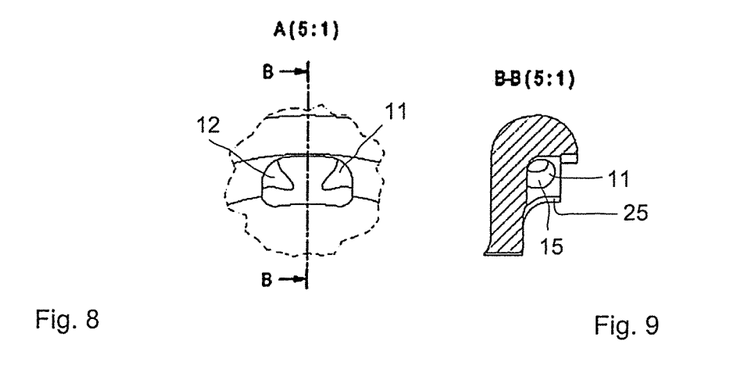
FIG. 8 enlarged detail A from FIG. 7.
FIG. 9 the enlarged section B-B of FIG. 8.

FIG. 8 shows an enlarged illustration of the detail "A" with the receiving pockets 11 and 12 recognizable.

FIG. 9 illustrates the step B-B in FIG. 8 in a once again enlarged illustration where the shoulder 25 to support and receive the spoke heads 8 is recognizable. In the case that a solely radial spoking is provided the spoke holes 14 or 15 are provided immediately at the shoulder 25. In case that receiving pockets 11 or 12 are provided, the receiving pockets 11 and 12 are in particular milled into the shoulder 25.

Figure 10:
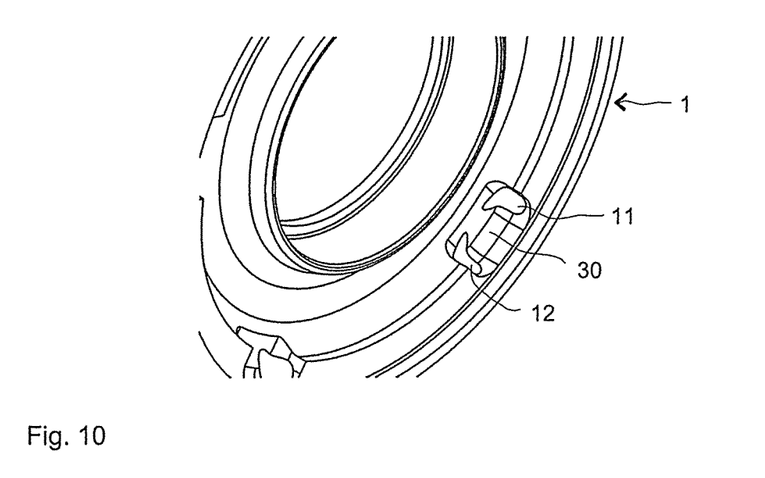
FIG. 10 an enlarged perspective view of a receiving pocket of a hub according to the invention.

FIG. 10 shows an enlarged perspective illustration of a detail of the hub flange 5 of the hub 1 with the receiving pockets 11 and 12 and their partially tangential orientation recognizable.

Figure 11:
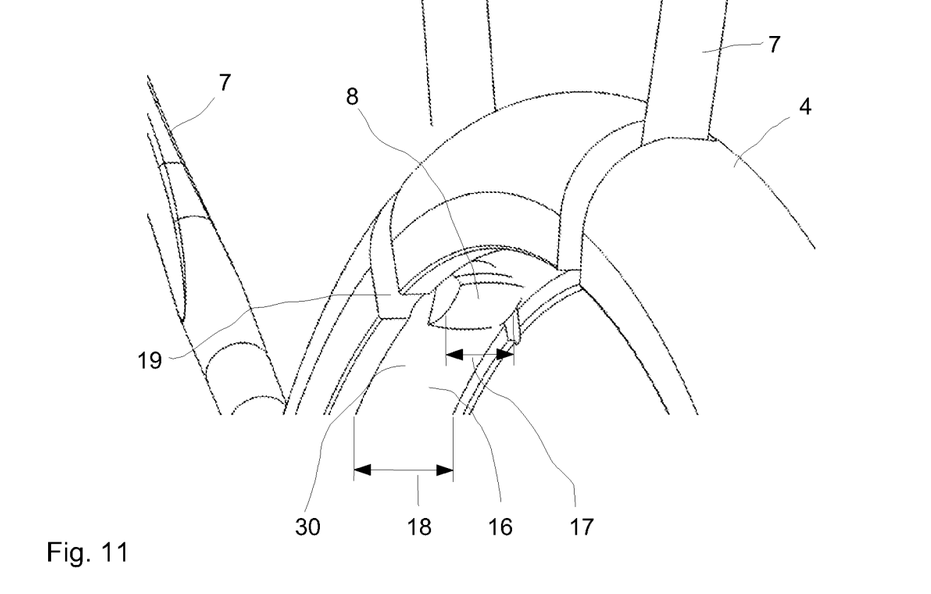
FIG. 11 an enlarged perspective view of a hub according to the invention with radial spoking.

FIG. 11 shows an enlarged detail of the hub flange 4 and of a rotor 21 with mounted spokes. The spokes 6 presently emerge radially from the hub flange 4 through the spoke holes 14 which are presently provided in the shape of a cutout 19. The spoke heads 8 of the spokes 6 are retained at the shoulder 25 while the spoke bodies 7 extend outwardly through the receiving element 14.

Figure 12:
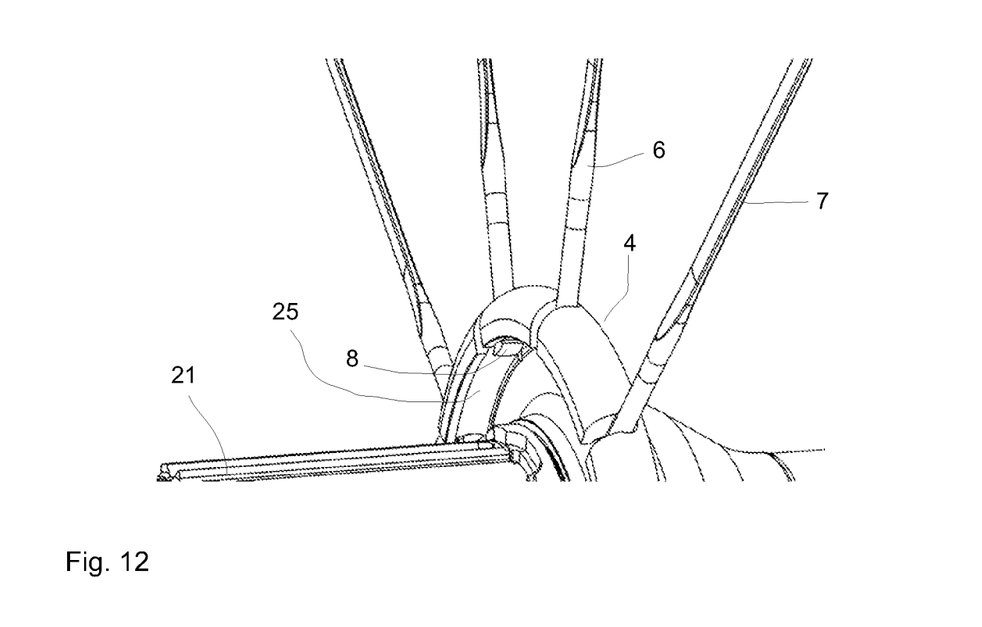
FIG. 12 an enlarged illustration of the hub flange according to FIG. 11.

In FIG. 12 an enlarged illustration according to FIG. 11 is shown with the spoke head 8 of a spoke 6 recognizably illustrated. In this configuration it is possible for the spoke head 6 to be retained in a kind of receiving groove 16 with the axial width 18 of the receiving groove 16 being larger than the axial width 17 of the spoke head 8 so as to ensure that the spoke head 8 one-sidedly bears against the side wall 13. This allows to ensure optimal alignment of the spoke and to effectively prevent unintended bending of the spoke.

Figure 13:
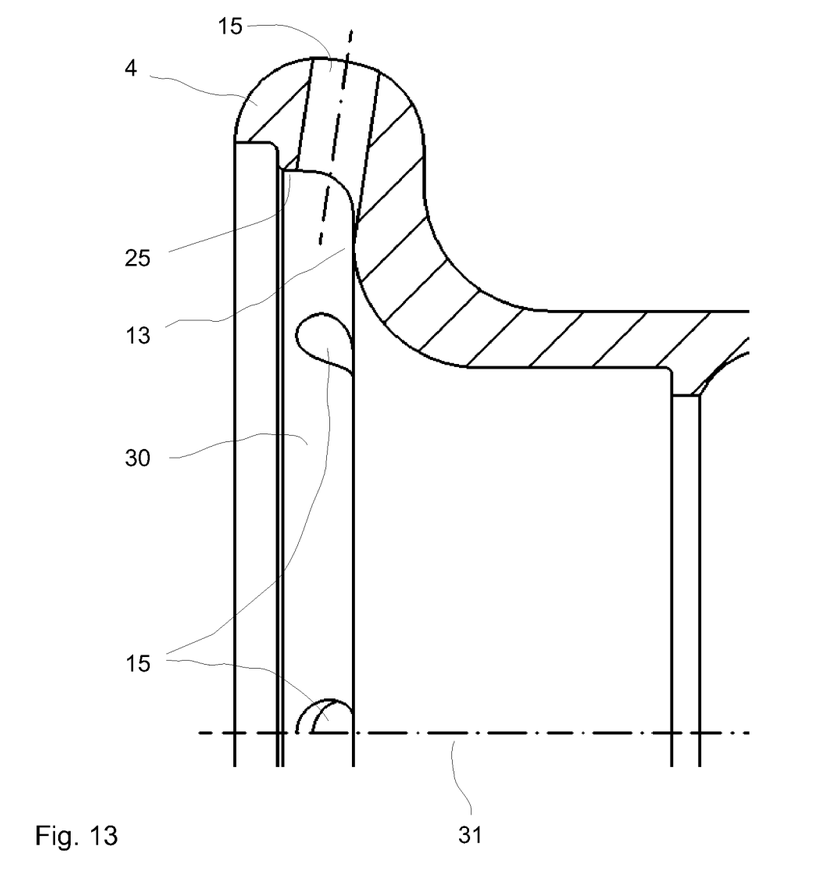
FIG. 13 an enlarged sectional view of a simply configured hub flange.

In FIG. 13 a simply configured hub flange 4 is illustrated in section. A center axis 31 is inserted as a rotationally symmetric line. The receiving space 30 is confined in the radial direction by the shoulder 25 and in the axial direction towards the hub center, by the side wall 13. The receiving space 30 is not confined axially outwardly. In the transition region of the radial shoulder 25 towards the axial side wall 13, spoke holes 15 are presently provided in the hub flange 4. One spoke 6 each is inserted into the spoke holes 15 from radially inwardly so as to have the spoke head 7 bear against the side wall 13 and the shoulder 25 where it is retained. An angularly matching orientation is possible and optimal by way of the shape and position of the bore of the spoke hole 15.

It is also possible for the spoke rim 4 according to FIG. 13 to be provided instead of the spoke holes 15 with axial punches 19 which the axially outwardly end makes in the flange.

On the whole, the invention provides an advantageous hub and an advantageous wheel by means of which a twist-proof assembly at the hubs is possible even if spoke bodies shaped knife-like are employed. To this end the spokes comprise flattened spoke heads 8 which only bear against one axial side wall 13 of the hub and are thus retained twist-proof.

The invention provides an advantageous hub and an advantageous wheel. An angularly defined alignment of the spokes can be ensured. The invention allows cost-effective manufacture of these hubs and wheels while allowing reliable operation having low air drag.

The invention claimed is:

1. A hub comprising: a hub body and an axle configured to rotatably receive the hub body, wherein the hub body includes at least one circumferential hub flange that receives a plurality of spokes, each of the spokes comprising a spoke body and a flattened spoke head having at least one flat side, wherein the hub flange comprises at least one spoke hole and a plurality of axial side walls defining at least one receiving space, and wherein after assembly, the at least one receiving space is axially outwardly open and bordered by one axial side wall, and the at least one receiving space is configured to fix the at least one flat side of the flattened spoke head against only one of the axial side walls of the hub flange.

2. The hub according to claim 1, wherein the at least one receiving space includes at least one receiving pocket for receiving a flattened spoke head.

3. The hub according to claim 2, wherein the receiving pocket is matched to the cross-section of the spoke head.

4. The hub according to claim 2, wherein the at least one receiving pocket is at least partially oriented tangentially to the circumference of the hub flange.

5. The hub according to claim 2, wherein the at least one receiving pocket is oriented radially.

6. The hub according to claim 1, wherein the at least one receiving space is provided with a circumferential shoulder.

7. A wheel comprising: a hub and a rim and a plurality of spokes wherein the hub comprises circumferential hub flanges at which the spokes are supported and from which the spokes emerge to connect the hub with the rim, wherein at least one of the spokes comprises a flattened spoke head and a spoke body that extends through a closed through-hole formed in at least one of the hub flanges, wherein said closed through-hole extends from an outer surface of said at least one of the hub flanges to a receiving space defined by a plurality of side walls of said at least one of the hub flanges, said spoke head extending into said receiving space, wherein after assembly, the receiving space is axially outwardly open and bordered by one axial side wall, and the flattened spoke head is disposed in a receiving groove in the receiving space and the flattened spoke head is fixed against one of the axial side walls of the hub flange.

8. The wheel according to claim 7, wherein the flattened spoke head is received and supported at a receiving pocket of the receiving space.

9. The wheel according to claim 8, wherein the receiving pocket is matched to the cross-section of the spoke head.

* * * * *